Patented Feb. 3, 1931

1,791,119

UNITED STATES PATENT OFFICE

SAMUEL CABOT, OF JAMAICA PLAIN, MASSACHUSETTS, ASSIGNOR TO SAMUEL CABOT, INC., OF BOSTON, MASSACHUSETTS, A CORPORATION OF MASSACHUSETTS

COLLOIDAL DISPERSION PRODUCT

No Drawing. Original application filed January 31, 1925, Serial No. 6,016. Divided and this application filed February 7, 1927. Serial No. 166,596.

The production of certain matter, notably mineral matter and certain organic matters in a state of colloidal fineness is very desirable in many industries, especially as such production has been impossible in the past.

My present invention contemplates a variety of such products in which solids, particularly those of amorphous structure, are brought into a state of colloidal fineness and maintained in that condition permanently and in that condition may be converted into many useful products of high efficiency.

While I propose to discuss my invention principally in terms of the pigment art, I would point out at the very outset that in addition to paints, stains, enamels, dyes and other coloring media, my invention is applicable to the production of dispersed solids for many other purposes, as in the case of catalysts which may be effectively extended for influencing reactions in different industries or in dispersing solids other than pigments, as for example, where it is desired to disperse mica in a dielectric structural material for insulation.

As the utility of my invention is of immediate importance in the pigment field and as that field well illustrates the principles involved, I will proceed to discuss my invention in its relation to pigment dispersion, it being understood that other similar mineral or organic matters may be treated by following the principles as laid down in connection with that art. In this connection, I refer to my prior application, Serial No. 6016, filed January 31, 1925, now Patent No. 1,662,999 of Mar. 20, 1928, in which both method and product were discussed and from which the subject of the present case has been divided.

As therein suggested, the desired pigment or solid matter is in a state of colloidal dispersion rendered thus by an adhesive and cohesive plastic whose normal cohesive and adhesive tenacity is superior to the interparticle cohesion of the pigment or solid materials. Where the product is to be extended or further dispersed as in the case of a paint or stain, this plastic is in accordance with my invention, a colloid dispersible in a selected dispersion medium. The colloidal plastic refererd to not only acts as a disruptive agent in tearing apart the particles of the material during the process of manufacture but acts as a protective colloid to the material in its state of subdivision.

Types of these protective colloids vary with the dispersion medium when it is desired to use the material in a further dispersed state as for example a liquid state. For liquid hydrocarbons and animal and vegetable oils, acceptable colloids are drying or semi-drying oils polymerized by heat treatment or oxidized or for alcohol dispersions the colloids might be cellulose nitrates or acetates.

The number of these products which are natural organosols in different organic dispersion media is very great, and I am not to be limited to any specific dispersion medium or group of media, or to liquids or organic liquids, or to any colloid or group of colloids. Organosol colloids differ from hydrosols in that they are much less active in causing colloidal dispersion of mechanical suspensions, especially when dilute. In fact, when in dilute or highly dispersed condition if the colloidal particles tend to attach themselves to the particles in mechanical suspension at all, they are apt to cause flocculation. As a result, suspended mineral solids are almost unknown in colloidal dispersion as organosols and are only produced by very indirect processes or occur but very occasionally accidentally in nature, though they are very common as hydrosols. In my products the solid particles are dispersed and the colloid peptized by them, and the colloid envelopes them, preventing them from clotting together again.

Lyophile dispersoid (polymerized drying oil) is preferably used by me as a protective colloid because of its advantage in manufacture acting as a disintegrator for the clumps of pigment. As such it must be of a sufficient cohesion so that the disruptive action of the kneading process will tend to break apart the pigment clumps rather than to pull apart the colloid. The best proportion is one in which only sufficient dispersion medium is used to bring the colloid from a hard or brittle gel condition to a plastic adhesive and cohesive one, and adding to this mixture as much solid as can be readily worked in a putty chaser, and to give maximum plasticity but only as much as to give continuous interfaces with the colloid. It will be found that after the mass has become kneaded a few minutes it will become more and more plastic.

The ratio of solid to colloid may be varied somewhat. To get good results there must be enough colloid to envelop and be adsorbed by the surfaces of the ultimate colloidally dispersed solid.

The solid has, under proper conditions the striking effect on the colloidal gel of tending to break down its gel structure, rendering it more plastic and less elastic, and making it capable of dispersing into the dispersion medium more readily. For instance, a stiff colloidal jelly which cannot be dispersed in a liquid dispersion medium by any usual method, may be plasticized by kneading with a powdered solid and readily dispersed together with the solid in liquid by suitable means. The gel has the property of plasticizing a combination of solid and liquid which would otherwise remain a damp powder.

After the kneading process the plastic mass may be extended to any desired extent, either in the putty chaser or any suitable mixer, with any medium in which the colloid will disperse.

When extended the product will usually be found to contain a small amount of granular coarse particles and from 70% to 100% of fine colloidally dispersed particles of varying size, which are often so fine in the case of pigments as to give a transparent effect and yet imparting their color to the whole, thus closely resembling organic dyes.

A characteristic product may be made for example of one part by weight of linseed oil jelly (containing about 30% turpentine) three parts of such a pigment as "Titanox" (a combination of titanium oxide and barium sulphate. To the pigment and colloid, plus liquid, when kneaded, may be added such quantities of raw or boiled linseed oil and turpentine or solvent naphtha as will make a good workable paint, and sufficient dryer as will make it dry at the rate required.

Such a product will be found to differ from a paint made with the same ingredients but by the usual grinding processes in that: (1) the pigment stays permanently in suspension; (2) it is more liquid; (3) it has more tinting power; (4) it has more spreading power; (5) it spreads more evenly; (6) it adheres more strongly to the surface; (7) on porous surfaces the fixative does not sink in and leave the pigment so that chalking is largely eliminated.

Such products may be used in the preparation of all manner of paints, stains, varnishes, enamels, rubber goods, plastics and the like whether they contain as their medium of dispersion hydrocarbons, animals or vegetable oils, alcohols, ethers, halogenated liquids, and innumerable others or whether their fixatives are drying oils, cellulose esters, fossil gums, rubber or the like.

What I therefore claim and desire to secure by Letters Patent is:

1. A paint, stain or the like comprising an organic dispersion medium, a semi-plastic treated oil dispersed in said medium, and pigment particles of colloidal fineness insoluble in said dispersion medium held in suspension in said medium by said oil.

2. A paint, stain or the like comprising an organic dispersion medium, a polymerized oil dispersed in said medium, and pigment particles of colloidal fineness insoluble in said dispersion medium held in suspension in said medium by said oil.

3. A paint, stain or the like comprising an organic dispersion medium, a colloid of the group consisting of a polymerized or oxidized oil dispersed in said medium, and pigment particles of colloidal fineness insoluble in said dispersion medium held in suspension in said medium by said oil.

In testimony whereof I affix my signature.

SAMUEL CABOT.